A. F. ROCKWELL.
ANTIFRICTION BEARING.
APPLICATION FILED AUG. 29, 1912.
1,172,738.
Patented Feb. 22, 1916.
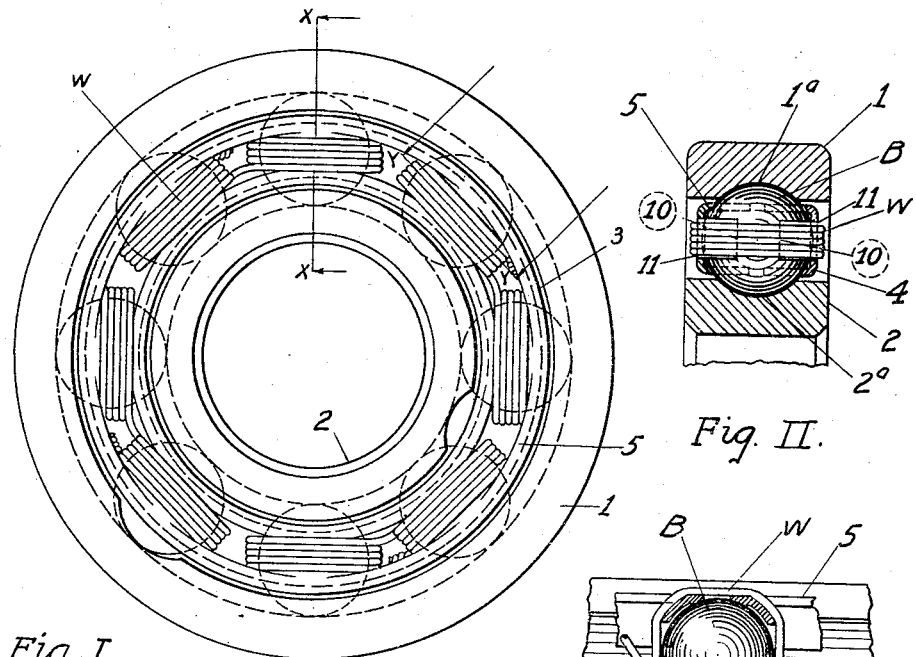
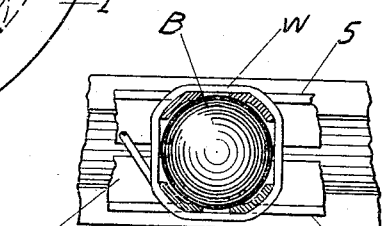
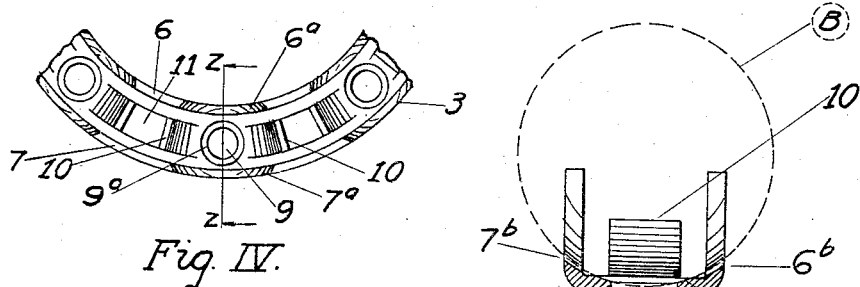
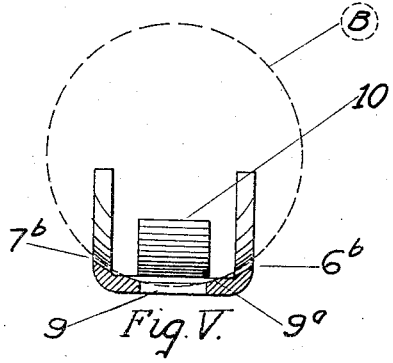
WITNESSES
INVENTOR:
ALBERT F. ROCKWELL
BY
ATTORNEY.

UNITED STATES PATENT OFFICE.

ALBERT F. ROCKWELL, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

ANTIFRICTION-BEARING.

1,172,738. Specification of Letters Patent. Patented Feb. 22, 1916.

Application filed August 29, 1912. Serial No. 717,702.

*To all whom it may concern:*

Be it known that I, ALBERT F. ROCKWELL, a citizen of the United States, residing at Bristol, county of Hartford, State of Connecticut, have invented a certain new and useful Antifriction-Bearing, of which the following is a full, clear, and exact description, such as will enable others skilled in the art to which it appertains to make and use the same, reference being had to the accompanying drawings, forming part of this specification.

My invention relates to antifriction bearings, and more particularly to a separator for accurately spacing the antifriction members of such bearings.

One object of my invention is to provide an antifriction bearing the antifriction members of which are accurately spaced by a separator having its parts secured in place in such a manner as to positively maintain the proper alinement and spacing of the members.

A further object is to provide a separator having positive, substantial and somewhat resilient means for securing the parts thereof in place.

A further object is to provide a separator which normally holds the antifriction members with the centers of the seats of the members in alinement with the axes of rotation of said members.

A further object is to provide a separator which holds the antifriction members under tension, in which the antifriction members positively space the parts of the separator, and in which the antifriction members are self-alining.

To these ends and also to improve generally upon devices of the character indicated, my invention consists in the various matters hereinafter described and claimed.

In the accompanying drawings, Figure I is a side elevation of an assembled bearing embodying my invention, but with the antifriction members shown in dotted lines; Fig. II is substantially a section on the line X—X Fig. I, looking in the direction of the arrows; Fig. III is a section on the line Y—Y Fig. I, looking in the direction of the arrows; Fig. IV is a partial plan view of one of the separator members; and Fig. V is an enlarged sectional view on the line Z—Z of Fig. IV, looking in the direction of the arrows, and showing in dotted lines a ball in place.

In the illustrated embodiment of my invention, the bearing has an outer bearing member 1 and an inner bearing member 2. A race $1^a$, $2^a$, respectively, is provided on each bearing member. The antifriction members, preferably balls B, travel in their races $1^a$, $2^a$, and between the inner and outer bearing members.

In the present embodiment, the separator or retainer 3 for the antifriction members preferably consists of separator or retainer sections which I may form, respectively, as a rear plate 4 and a front plate 5 of stamped metal, these plates being preferably annular in shape and, when assembled, oppositely disposed to each other. These plates may be connected and spaced apart by any suitable means conducive to the desired results. A preferable means, that shown in the drawings, will be described hereinafter.

The plates are shown as alike and therefore a description of one will suffice for both. The preferably annular plate is provided upon its inner and outer edges with upstanding flanges 6 and 7, respectively, which are here shown as cut away, to provide openings $6^a$, $7^a$, respectively, through which the balls project, preferably without contact with the edges thereof. The openings (one for each ball) of a flange are preferably equally spaced circumferentially and the corresponding openings $6^a$, $7^a$, of the two flanges may be, as shown, in approximate radial alinement. Also the edges of the openings may be beveled to approximately conform to the surface curve of ball B, as indicated at $6^b$, $7^b$. The upstanding parts 8 remaining after providing the openings are likewise preferably equally spaced circumferentially. In the body of the annulus and between the flanges, and approximately in alinement with the openings of a pair, may be provided seating means for the antifriction member coöperating with said openings, which means is shown as an aperture 9, there being a series of such apertures, one for each member, and these apertures may be circular and preferably have the edges shaped, as by grinding, countersinking or other suitable manner, as indicated at $9^a$, that they may better conform to the surface curve of the balls and aid in maintaining the balls with the centers of the two seats (one on each plate) of each ball in alinement with the axis of rotation of such ball.

Upon the annulus, and as here shown, stamped up therefrom, are provided a series of parts such as 10 which I may term "fingers". These fingers are preferably arranged in pairs, the elements of a pair opposing each other, and may be somewhat yielding and are shaped to partially circumscribe the antifriction members and, as here shown, are curved upon a curve of slightly greater diameter than that of the ball B with which they coöperate, and are slightly spaced therefrom. A pair of fingers of one plate coöperates with a like pair on the other plate, such four fingers forming a set for the reception of a ball. As shown, the fingers are of somewhat less length, approximately longitudinally of the bearing, than are the flanges. Preferably, and as here shown (Fig. III), the aggregate length, approximately longitudinally of the bearing, of corresponding and mating flanges of the pair of annuli is less than the diameter of a ball B whereby when the parts are assembled the rear and front sections of the separator are, by the balls, spaced from each other longitudinally of the bearing.

Suitable connecting means are provided for the plates and such means are preferably resilient and placed under tension. As shown, such means are windings W, preferably of wire, about each set of fingers and passing through apertures 11 in the plates preferably provided by the stamping up of the fingers. The winding means may, as shown, be continuous from one winding to the next. As here shown, the lengths of the fingers and their configurations are such that the winding is, at the points where it bridges the gap between corresponding fingers, at less radial distance from the balls than are the fingers. It results from this construction that, should the ball move sufficiently from its seats (as when subjected to the load) it will strike the tensioned and resilient winding rather than the fingers and, by the reaction of the winding, be returned to its seats. The winding is preferably placed under some tension which causes the seats and fingers to be placed under tension and with the centers of the seats of each ball positively held in alinement with the axis of rotation of such ball. Moreover, by this construction the balls and separator parts are so assembled that rattling is practically eliminated.

The separator may be assembled with the balls after the balls are in place in the bearing, and the seats and the connection between the separator plates being somewhat yielding the separator adapts itself to the proper position of the balls which are then held with the centers of the seats of each ball in alinement with the axis of rotation of such ball.

Thus, it will be seen that I have provided a bearing in which not only are the antifriction members normally held under tension against undue movement and in which resilient tensional means returns the balls to proper position should they unduly move from their seats whereby the greatest efficiency is obtained and rattling eliminated, but also one which can be easily and accurately assembled, requires but inexpert labor to manufacture and assemble, and in which the parts of the separator are resiliently, strongly and positively held apart under tension whereby rattling of the separator parts is avoided.

Having thus described my invention, what I claim as new and desire to secure by Letters Patent is

1. In a device of the character indicated, in combination, a separator comprising a pair of mating sections each in the character of a trough-shaped annulus having inner and outer edge flanges, a series of antifriction-member seats formed in the body portion thereof and between said flanges and fingers upstanding between said flanges and at the sides of said seats, a series of antifriction members received upon said seats and between said fingers, and means carried by said fingers for holding said sections and members assembled; substantially as described.

2. In a device of the character indicated, in combination, a separator comprising a pair of mating sections each in the character of a trough-shaped annulus having inner and outer edge flanges, a series of antifriction-member seats formed in the body portion thereof and between said flanges and fingers upstanding between said flanges and at the sides of said seats, a series of antifriction members received upon said seats and between said fingers, said fingers being flared from said seats to normally stand free of said members, and means carried by said fingers for holding said sections and members assembled; substantially as described.

3. In a device of the character indicated, in combination, a separator comprising a pair of mating sections each in the character of a trough-shaped annulus having inner and outer edge flanges, a series of antifriction-member seats formed in the body portion thereof and between said flanges, fingers upstanding between said flanges and at the sides of said seats and openings between the opposed fingers of adjacent seats, a series of antifriction members received upon said seats and between said fingers, and means carried by said fingers and passing through said openings for holding said sections and members assembled; substantially as described.

4. In a device of the character indicated, in combination, a separator comprising a pair of mating sections each in the character of a trough-shaped annulus having inner and outer edge flanges, a series of antifriction-member seats formed in the body portion thereof and between said flanges, fingers upstanding between said flanges and at the sides of said seats and openings between the opposed fingers of adjacent seats, a series of antifriction members received upon said seats and between said fingers, said fingers being flared from said seats to normally stand free of said members, and means carried by said fingers and passing through said openings for holding said sections and members assembled; substantially as described.

5. In an antifriction bearing a device of the character indicated, the combination with a separator comprising opposed sections each provided with a pair of fingers extending toward the fingers of the other section, of an antifriction member received between and spaced from the elements of said pairs of fingers and holding separated the opposed sections, thereby to provide gaps between the pair of fingers of one section and that of the other, and resilient means bridging said gaps thereby to engage said antifriction member upon undue movement thereof between said fingers; substantially as described.

6. In an antifriction bearing a device of the character indicated, the combination with a separator comprising opposed sections each provided with a pair of fingers and with an antifriction member seat between said fingers, the pair of fingers of one section extending toward the pair of the other section, of an antifriction member received between said pairs of fingers and upon said seats and holding separated the opposed sections thereby to provide gaps between the pair of fingers of one section and that of the other, and tensioned means carried by said fingers for connecting said sections and holding said seats in contact with said antifriction members; substantially as described.

7. In an antifriction bearing a device of the character indicated, the combination with a separator comprising opposed sections each provided with a pair of fingers and with an antifriction member seat between said fingers, the pair of fingers of one section extending toward the pair of the other section, of an antifriction member received between said pairs of fingers and upon said seats and holding separated the opposed sections, thereby to provide gaps between the pair of fingers of one section and that of the other, and resilient means bridging said gaps thereby to engage said antifriction member upon undue movement thereof from said seats; substantially as described.

8. In an antifriction bearing a device of the character indicated, the combination with a separator comprising opposed sections each provided with a pair of fingers and with an antifriction-member seat between said fingers, the pair of fingers of one section extending toward the pair of the other section, of an antifriction member received between and spaced from the elements of said pairs of fingers and upon said seats and holding separated the opposed sections, thereby to provide gaps between the pair of fingers of one section and that of the other, and tensioned and resilient means for connecting said sections and holding said seats in contact with said antifriction members, said means bridging said gaps thereby to engage said antifriction member upon undue movement thereof from said seats; substantially as described.

9. In a device of the character indicated, in combination, a separator comprising two like and mated opposed annular sections each provided along its body with a series of circular ball seats and with a series of pairs of fingers struck up from the body to provide apertures therein, the elements of each pair being upon opposite sides of a corresponding seat and located to be spaced from a ball to be received between them and upon said seat, a series of balls between said sections and upon said seats, the diameter of a ball being greater than the combined lengths of the two mating fingers of the opposed sections whereby a gap is provided between the ends of said fingers, and tensioned resilient wire passed through the mating apertures of the opposed sections, bound upon said fingers, bridging said gaps and connecting said sections to hold said seats in contact with said balls, the lengths of said fingers and said gaps being such that should a ball move unduly from its seat it will strike said wire and be returned to its seat by the reaction thereof; substantially as described.

10. In a device of the character indicated, in combination, a separator comprising two like and mated opposed annular sections channel-shaped in cross-section and each provided along its body with a series of circular ball seats and with a series of pairs of fingers struck up from the body to provide apertures therein, the elements of each pair being upon opposite sides of a corresponding seat and located to be spaced from a ball to be received between them and upon said seat each section being also provided in each of its sides with a recess adjacent each seat, a series of balls between said sections and upon said seats and projecting into said recesses, the diameter of a ball being greater than the combined lengths of the two mating fingers of the opposed sections whereby a gap is provided between the ends of said fingers, and tensioned resilient wire passed through the mating apertures of the opposed sections, bound upon said fingers, bridging said gaps and connecting said sections to hold said seats in contact with said balls, the lengths of said fingers and said gaps being such that should a ball move unduly from its seat it will strike said wire and be returned to its seat by the reaction thereof; substantially as described.

In testimony whereof, I hereunto affix my signature, in the presence of two witnesses.

ALBERT F. ROCKWELL.

Witnesses:
KATHERINE F. JOHNSTON,
CHARLES S. JOY.

Copies of this patent may be obtained for five cents each, by addressing the "Commissioner of Patents, Washington, D. C."

Correction in Letters Patent No. 1,172,738.

It is hereby certified that in Letters Patent No. 1,172,738, granted February 22, 1916, upon the application of Albert F. Rockwell, of Bristol, Connecticut, for an improvement in "Antifriction-Bearings," an error appears in the printed specification requiring correction as follows: Page 3, lines 21, 36, 53, and 70, claims 5, 6, 7, and 8, strike out the words "an antifriction bearing;" and that the said Letters Patent should be read with this correction therein that the same may conform to the record of the case in the Patent Office.

Signed and sealed this 14th day of March, A. D., 1916.

[SEAL.]

J. T. NEWTON,
*Acting Commissioner of Patents.*

Cl. 64—59.